US011086940B1

(12) United States Patent
Borthwick et al.

(10) Patent No.: US 11,086,940 B1
(45) Date of Patent: Aug. 10, 2021

(54) SCALABLE PARALLEL ELIMINATION OF APPROXIMATELY SUBSUMED SETS

(71) Applicant: Amazon Technologies, Inc., Seattle, WA (US)

(72) Inventors: Andrew Borthwick, Kirkland, WA (US); Stephen Michael Ash, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 115 days.

(21) Appl. No.: 16/588,296

(22) Filed: Sep. 30, 2019

(51) Int. Cl.
*G06F 16/9035* (2019.01)
*G06F 16/901* (2019.01)
*G06K 9/62* (2006.01)
*G06F 16/906* (2019.01)

(52) U.S. Cl.
CPC ........ *G06F 16/9035* (2019.01); *G06F 16/906* (2019.01); *G06F 16/9024* (2019.01); *G06K 9/6219* (2013.01)

(58) Field of Classification Search
CPC ............. G06F 16/9035; G06F 16/9024; G06F 16/906; G06K 9/6219
USPC ....................................................... 707/722
See application file for complete search history.

(56) References Cited

U.S. PATENT DOCUMENTS

| | | | |
|---|---|---|---|
| 10,901,973 B1 * | 1/2021 | Senra ..................... | G06F 16/258 |
| 2006/0112133 A1 * | 5/2006 | Ljubicich ............ | G06F 16/9024 |
| 2014/0032594 A1 * | 1/2014 | Bayliss ................. | G06F 16/282 |
| | | | 707/769 |
| 2015/0379409 A1 * | 12/2015 | Hu .......................... | G06F 16/20 |
| | | | 706/55 |
| 2016/0283569 A1 * | 9/2016 | Dantressangle .... | G06F 16/2465 |
| 2017/0149895 A1 * | 5/2017 | Deng ...................... | H04L 47/70 |
| 2018/0096001 A1 * | 4/2018 | Soza ..................... | G06F 16/235 |
| 2018/0232445 A1 * | 8/2018 | Gomadam ........... | G06F 16/256 |
| 2018/0373781 A1 * | 12/2018 | Palrecha .............. | G06N 3/0427 |
| 2020/0174966 A1 * | 6/2020 | Szczepanik .......... | G06F 16/116 |

OTHER PUBLICATIONS

Movshovitz-Attias, Dana, et al., "Discovering Subsumption Relationships for Web-Based Ontologies", WebDB '15, Melbourne, VIC< Australia, May 31-Jun. 4, 2015, pp. 62-69.*

(Continued)

*Primary Examiner* — Robert Stevens
(74) *Attorney, Agent, or Firm* — Nicholson De Vos Webster & Elliott LLP

(57) ABSTRACT

Techniques for Scalable parallel elimination of approximately subsumed sets are described. A method for Scalable parallel elimination of approximately subsumed sets includes identifying a first plurality of blocks based at least on a plurality of records stored in a storage service of a provider network, determining a plurality of subsumption relationships between blocks from the first plurality of blocks, retaining a first subset of the first plurality of blocks and demoting a second subset of the first plurality of blocks based at least on the plurality of subsumption relationships, and iteratively performing dynamic blocking based at least on the first subset of the plurality of matching blocks and the second subset of the plurality of matching blocks to generate a subsequent pluralities of blocks.

20 Claims, 11 Drawing Sheets

(56) References Cited

OTHER PUBLICATIONS

Bleiholder, Jens, et al., "Eliminating NULLs with Subsumption and Complementation", Bulletin of the Technical Committee on Data Engineering, vol. 34, No. 3, Sep. 2011, IEEE Computer Society, pp. 18-25.*

Artale, Alessandro, et al., "A Computational Account for a Description Logic of Time and Action", Principles of Knowledge Representation and Reasoning, Proc. of the 4th Int'l Conf. (KR '94), The Morgan Kaufmann Series in Representation and Reasoning, (c) 1994, pp. 3-14.*

"Hierarchy", Wikipedia, downloaded from: https://en.wikipedia.org/wiki/Hierarchy#Subsumptive_containment_hierarchy, Mar. 22, 2021, pp. 1-12.*

* cited by examiner

US 11,086,940 B1

SCALABLE PARALLEL ELIMINATION OF APPROXIMATELY SUBSUMED SETS

BACKGROUND

Data lakes provide a centralized repository for customer data, including structured and unstructured data. This allows customers to store all of their data in whatever formats or types it is available in a single place. However, setting up and managing data lakes today involves a lot of manual, complicated, and time-consuming tasks. This work includes loading data from diverse sources, monitoring those data flows, setting up partitions, turning on encryption and managing keys, defining transformation jobs and monitoring their operation, re-organizing data into a columnar format, configuring access control settings, deduplicating redundant data, matching linked records, granting access to data sets, and auditing access over time.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for scalable parallel elimination of approximately subsumed sets. According to some embodiments, matching and approximately matching records can be identified in a customer's data lake. A data lake may include structured and unstructured data from various data sources and may include records in varying formats with varying data values that represent that same real world entities (e.g. the same person, product, business, movie, etc.). These variations may be due to errors, omissions, or different ways of representing the same information. Intersection Dynamic Blocking, and other dynamic blocking techniques, may be used to find duplicate records in a data lake. However, such blocking techniques may fail in large databases that may include large numbers of highly overlapping records. Such highly overlapping records do not shrink in size quickly enough during dynamic blocking to counteract the numbers of new blocks that are created during intersection, which may end up creating too many blocks to be processed and lead to system failure. Embodiments are directed to multiple techniques to address such issues when processing highly overlapping blocks.

Figure 1:
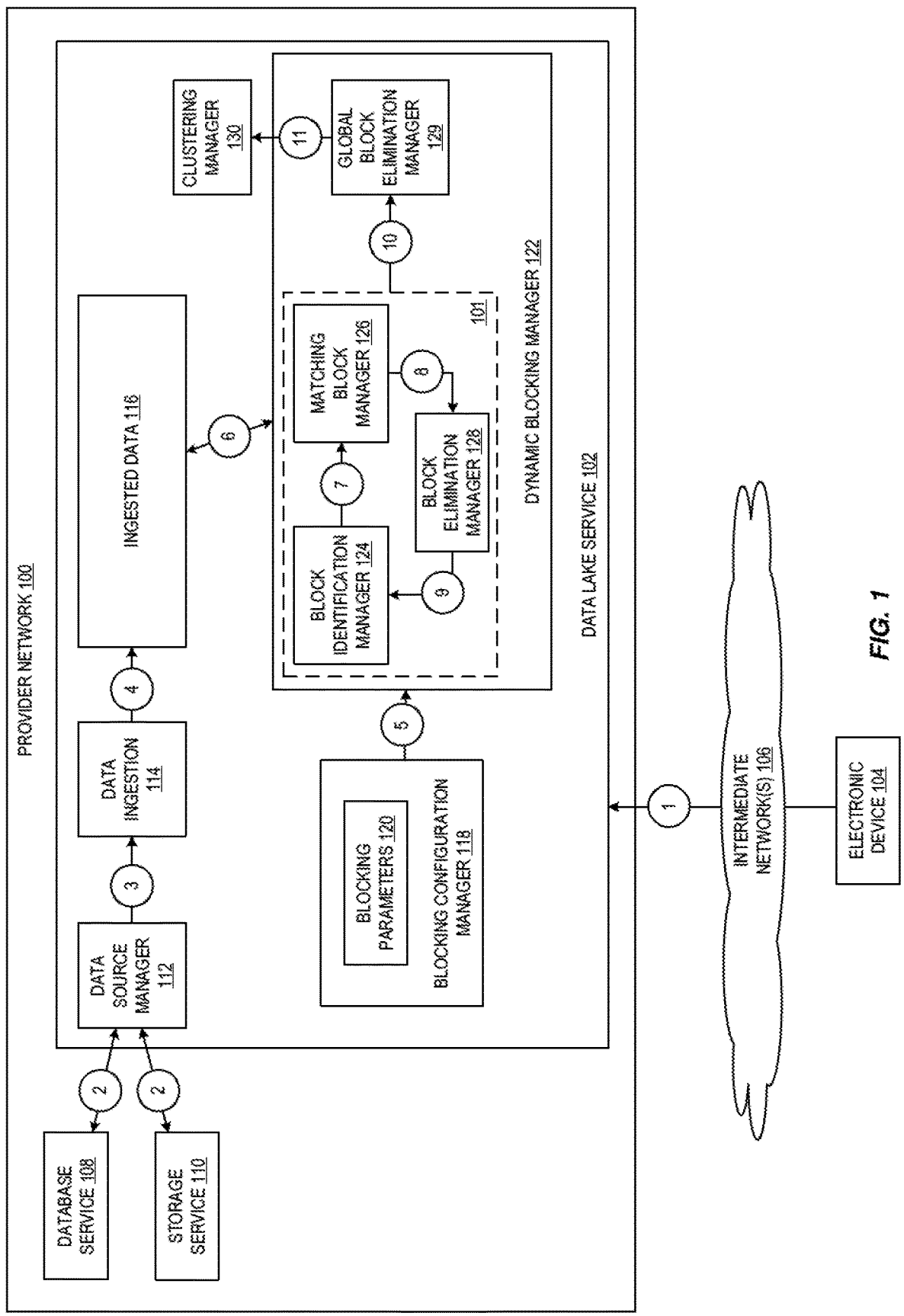
FIG. 1 is a diagram illustrating an environment for scaling record linkage via elimination of highly overlapped blocks according to some embodiments.

FIG. 1 is a diagram illustrating an environment for scaling record linkage via elimination of highly overlapped blocks according to some embodiments. As shown in FIG. 1, a provider network 100 may include a data lake service 102. Data lakes provide a centralized repository for customer data, including structured and unstructured data. This allows customers to store all of their data, in whatever formats or types the data is available, in a single place. A data lake service 102 can manage data ingestion, cleaning, cataloging and other services of the customer's data in the data lake. In some embodiments, as shown at numeral 1, a customer, using electronic device 104, can send a request over one or more intermediate networks 106 to data lake service 102 to add their data to a data lake. The customer data may be stored in various locations, such as in one or more data base services 108 or storage services 110 in provider network 100. In some embodiments, the customer data may additionally, or alternatively, be stored in one or more storage locations external to provider network 100 which may be accessible to the data lake service 102 over one or more intermediate networks 106. The request may include the locations of the data (e.g., uniform resource identifiers (URIs), uniform resource locators (URLs) or other location information) and credentials with which the data may be accessed (e.g., username and password, or other credentials).

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

As shown at numeral 2, in response to the request to import data from one or more sources to the customer's data lake, a data source manager can obtain the customer data from database service 108 and/or storage service 110. The data source manager may be an interface configured to send requests to, and receive data from, one or more endpoints associated with database service 108 and/or storage service 110. At numeral 3, the data source manager 112 can pass the data to a data ingestion manager 114. In some embodiments, data ingestion manager 114 can perform one or more operations on the data obtained from the data sources, such as normalization. Normalization may include transformations that remove common typographical variance that is usually unimportant in distinguishing semantic similarity. For example, character casing may be made consistent and some punctuation may be removed or added.

Once the data has been ingested, at numeral 4, it can be added to ingested data 116. Ingested data 116 may represent the customers data as added to a data lake managed by data lake service 102. In some embodiments, ingested data 116 may be added to a new storage location in storage service 110 that is owned by data lake service 102. When a customer adds data from multiple sources, they may have various similar, but not identical records, that refer to the same real world entity. Data lake service 102 can perform approximate record matching and/or database deduplication on the customer's ingested data 116. The initial step is to perform blocking, which involves finding candidate pairs of records that are potential matches for further processing so that the system does not have to compare all ($_2^n$) pairs of records. In some embodiments, dynamic blocking manager 118 can implement intersection dynamic blocking techniques to ensure acceptable sized output blocks are produced that do not include duplicates, as discussed further below with respect to FIG. 2.

Dynamic blocking can identify, for every record, a least restrictive combination of blocking key values that can be used to identify possible matches for that record. In this way, a more common blocking key value would be dynamically required to block on more field values to be produced as a candidate pair, whereas rare blocking key values that are already distinguishing do not need to block on additional values. Blocking configuration manager 118 can determine blocking parameters 120 to be used to perform dynamic blocking. In some embodiments, the blocking parameters may be determined automatically based on the ingested data and feedback received from the customer, as discussed further with respect to FIG. 3. In some embodiments, the blocking parameters 120 may be provided by a customer, administrator, or other entity to be used to perform dynamic blocking. At numeral 5, the blocking parameters can be passed to dynamic blocking manager 122 to perform dynamic blocking. In some embodiments, the blocking parameters can include a list of columns to be used as blocking keys, a parameter indicating the maximum block size that represents a maximum number of records in a block that dynamic blocking manager 122 should emit, and a designation of the columns on which Locality Sensitive Hashing (LSH) blocking keys are to be generated.

At numeral 6, dynamic blocking manager 122 can obtain sets of records. As discussed, blocking may include performing a pairwise comparison of records. However, if a first set A includes the records (A, B, C, D, E) and a second set B includes the records (B, C, D), then performing an all pairs comparison of both sets will result in duplicative work, as the comparison of set B is a subset of the comparison of set A. Such duplication of work can become prohibitive in large datasets with similar blocks. As such, embodiments identify the sets within it that are not a subset of any other set to be used to perform blocking. When a block is identified as a subset, or approximate subset, of another block, it can be discarded.

Numerals 7-9 illustrate an iterative intersection dynamic blocking loop 101 in which blocks that are identified as a subset or approximate subset of another block are discarded. Block identification manager 124 can identify blocks using a dynamic blocking technique, such as intersection dynamic blocking described below with respect to FIG. 2. At numeral 7, These blocks can be passed to matching block manager 126 which can identify matching blocks using Jaccard similarity, or other similarity metrics. For example, the matching block manager can determine the Jaccard similarity index of two blocks as:

$$Jaccard(B_1, B_2) = \frac{|B_1 \cap B_2|}{|B_1 \cup B_2|}$$

If the Jaccard similarity of two or more blocks is above a threshold value, then at numeral 8 these blocks can be passed to block elimination manager 128. Block elimination manager can select one block from the matching blocks to be representative of all of the matching blocks. In some embodiments, the block elimination manager may select the largest block (e.g., the block having the most records) as being representative of the matching blocks. The other blocks may then be deleted (e.g., deduplicated) by the block elimination manager 128. The resulting representative blocks can then be passed to block identification manager 124, at numeral 9, to perform another round of dynamic blocking using the representative blocks.

In some embodiments, after each iteration of the intersection dynamic blocking loop 101 represented by numerals 7-9, the Jaccard similarity threshold used can be reduced. For example, during the initial round of processing, the Jaccard similarity threshold may be high (e.g., 0.9 or higher), such that in the initial round only very similar blocks are deduplicated. By reducing the threshold similarity value in each iteration, more blocks, that are less similar, may be deduplicated, until a minimum threshold has been applied. In some embodiments, the minimum threshold may be 0.5. In some embodiments, users may specify the range of threshold to be used and/or a threshold to be used in each iteration of processing.

Optionally, in some embodiments, at numeral 10 a global block elimination manager can globally analyze blocks that are produced as a result of all iterations, or several iterations, of the intersection dynamic blocking loop 101, to determine whether any of these output blocks are exactly subsumed by any other output blocks. A block that is exactly subsumed by another block is redundant and therefore may be eliminated from further processing. In some embodiments, global block elimination manager can obtain the set of output blocks generated by all of the iterations of loop 101 and can partition this set into two subsets $S_r$ and $S_d$. The blocks added to $S_d$ can be safely discarded because they have a high level of subsumption by sets in $S_r$. Subsumption of a set, u, by another set, t, can be defined based on the fraction of elements of u that are included in t, and the cardinality of t relative to u (e.g., the number of elements in t relative to the number of elements in u). For example, pairwise subsumptions can be detected by comparing the number of co-occurrences of each pair of sets t and u with the size of t and u. The global block elimination manager 129 can identify block identifiers associated with each record. It may then emit all pairs of block IDs for each record and count the frequency of each pair. Thus, a frequency of each pair of sets can be determined and from that frequency it can determine whether a block is subsumed by another block.

Once an end condition has been reached (e.g., if all resulting blocks are below the maximum block size parameter, or if the minimum similarity threshold has been applied, etc.), then the resulting blocks can be passed to clustering manager 130 at numeral 11. In some embodiments, if any resulting blocks still exceed the maximum block size, then these blocks may be discarded prior to sending the resulting blocks to the clustering manager Clustering manager 130 can implement a matching algorithm, such as a pairwise matching algorithm and a clustering algorithm, such as transitive closure clustering, to identify matching records based on the resulting blocks. In some embodiments, the matching algorithm can be used to determine a probability that each pair of records of each resulting block provided by dynamic blocking manager 122 is a match. Based on the probabilities, a sparse weighted graph can be constructed in which the vertices correspond to input records and the weighted edges are the pairwise similarity score. The clustering algorithm can partition this graph into non-overlapping clusters of records such that each partition corresponds to a real-world entity.

Figure 2:
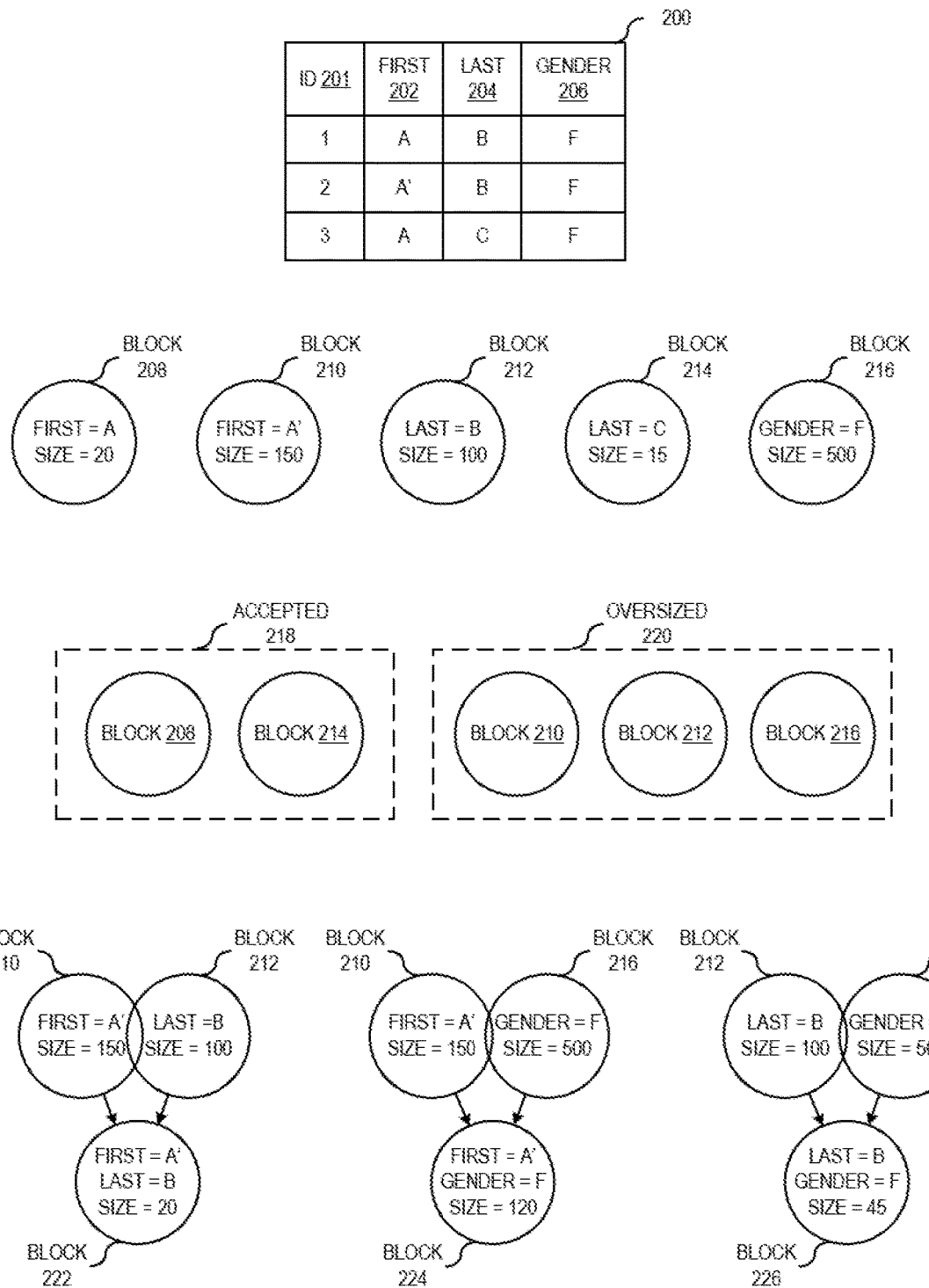
FIG. 2 is a diagram illustrating an example of intersection dynamic blocking according to some embodiments.

FIG. 2 is a diagram illustrating an example of intersection dynamic blocking according to some embodiments. Dynamic blocking can identify, for every record, a least restrictive combination of blocking key values that can be used to identify possible matches for that record. In this way, a more common blocking key value would be dynamically required to block on more field values to be produced as a candidate pair, whereas rare blocking key values that are already distinguishing do not need to block on additional values. A sample of records 200 shown in FIG. 2 can include a column of identifiers 201, a column of first names 202, a column of last names 204, and a column of genders. For example, the records 200 may correspond to employee records, or other records identifying people. In an initial round of blocking, blocks may be created by blocking on the value of each respective key. In this example, first, last, and gender columns have each been identified by the blocking parameters as being columns from which blocking keys may be generated. For example, five blocks may be generated 208-216, each based on the different values of each key. For example, block 208 includes all records from records 200 that include a value of first name=A, block 210 includes all records from records 200 that include a value of first name=A', etc. The size of each block corresponds to the number of records in that block. Each block can be hashed to a block identifier and the blocks can be separated into acceptable sized blocks 218 (e.g., blocks smaller than or equal to the maximum block size parameter) and oversized blocks 220 (e.g., blocks larger than the maximum block size parameter). In the example of FIG. 2, the maximum block size parameter is 50, making blocks 208 and 214 acceptable, and blocks 210, 212, and 216 oversized.

Oversized blocks 220 can be intersected with each other to further reduce the blocks. The intersected blocks can include multiple blocking values, from the two parent blocks. For example, block 210 and block 212 can be intersected to create block 222, with blocking keys from the first name and last name columns, blocks 210 and 216 can be intersected to create block 224, with blocking keys from the first name and gender columns, and blocks 212 and 216 can be intersected to create block 226, with blocking keys from the last name and gender columns. The resulting blocks can be hashed into new block identifiers. The new blocks that are below the max block size can then be output by the dynamic blocking manager. In some embodiments, blocks that still exceed the max block size parameters can continue to be intersected with other blocks. In some embodiments, after a number of iterations, any blocks that are still too large (e.g., block 224) may be discarded if the block size cannot be reduced below the max block size parameter.

Figure 3:
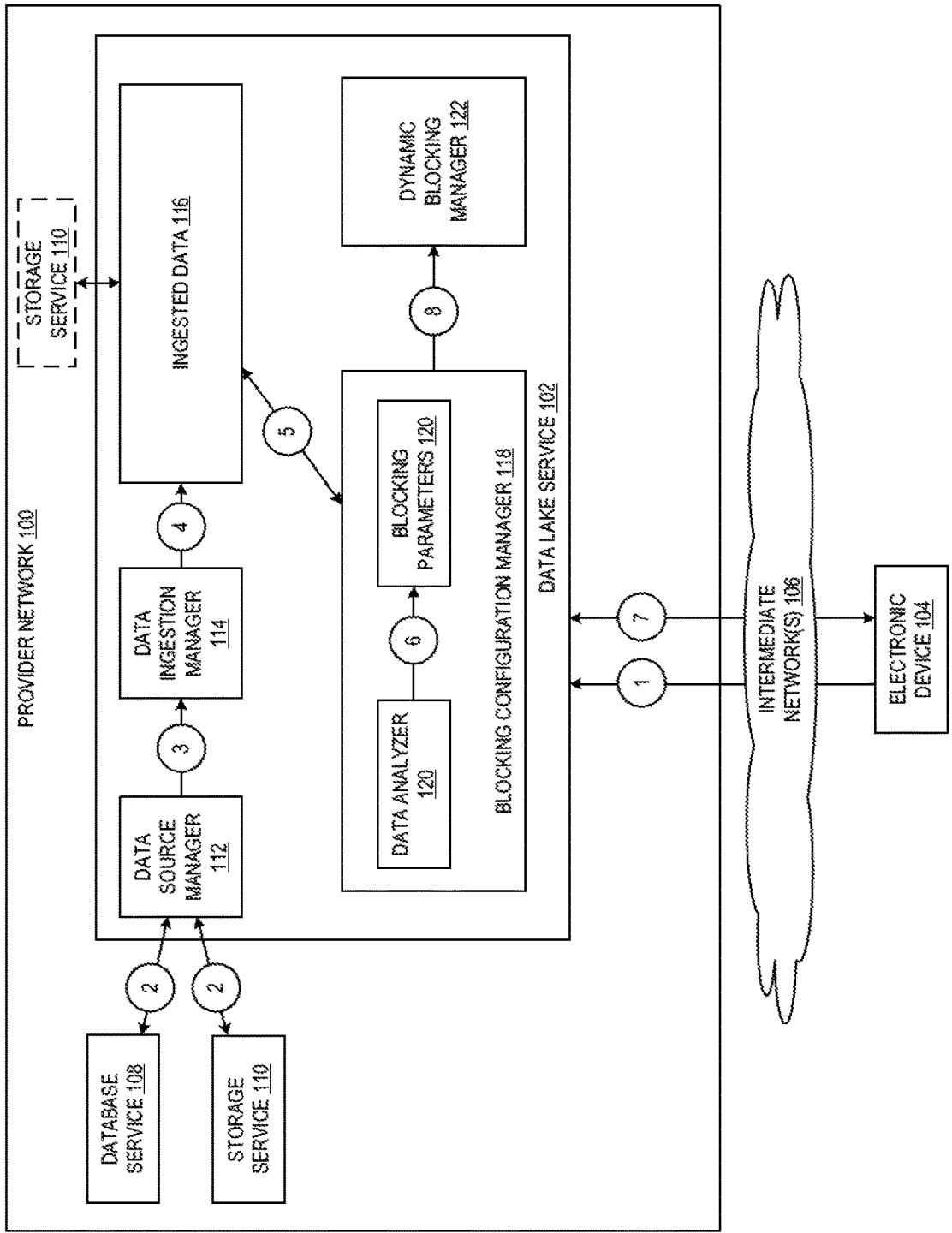
FIG. 3 is a diagram illustrating an environment for automatic blocking configuration according to some embodiments.

FIG. 3 is a diagram illustrating an environment for automatic blocking configuration according to some embodiments. Ingestion of the customer's data may proceed at numerals 1-4, as described above with respect to FIG. 1. As discussed above, blocking parameters 120 can be maintained by blocking configuration manager 118. Such parameter tuning may be outside of the skillset of a typical customer, accordingly blocking configuration manager 118 can automatically determine blocking parameters 120, as shown at numeral 5.

Blocking configuration manager 118 may include a data analyzer 300 which can determine statistics about the data. These statistics may then be used to identify appropriate blocking parameters based on criteria provided by the customer. In some embodiments, these parameters may include a max blocks size, a list of columns to use as blocking keys, identification of level 1 and level 0 keys, which columns are to be used to perform locality sensitive hashing (LSH), or column normalization rules to be applied to one or more columns of the records. Locality-sensitive hashing (LSH) is a technique in which similar inputs are hashed into the same buckets. This enables similar inputs to be clustered together. The values of these parameters affect the overall record linkage runtime and recall due to blocking. At one extreme, if a user prefers fast execution time and low cost then the blocker can block on few columns, use a conservative max block size, and use conservative LSH. In the embodiment shown in FIG. 5, these parameters may be derived directly from the ingested data 116. Automatic configuration can include computing descriptive statistics on columns of the ingested data, removing columns that match exclusionary criteria, picking column levels, picking LSH parameters, and picking the max block size.

In some embodiments, the statistics may include counts of the number of records r, null values $v_n$, logically missing values $v_m$ (such as the empty string or empty array), and the number of distinct values d that are not null or logically missing. Another statistic, referred to herein as distinctUncertainty u captures a proportion of distinct values to total usable values in a way that is maximal when the proportion of distinct to total values is 0.5. Precisely u is defined as:

$$u = \frac{d}{r - v_n - v_m} \times \left(1 - \frac{d}{r - v_n - v_m}\right)$$

In some embodiments, exclusionary criteria can be used to remove columns that are inappropriate for blocking due to insufficient information or being almost unique. Columns that match any of these conditions are excluded from being automatically picked blocking key columns:

$d < \max(4, \sqrt{r - v_n - v_m})$ $r - v_n - v_m < \max(4, r/100)$ $d \geq 0.999 * (r - v_n - v_m)$ Next, data analyzer 300 can determine which eligible columns are level 0 and level 1 by sorting the eligible columns descending by distinctUncertainty u, and picking a number of columns that satisfy $u > x*(1-x)$, where x is a configurable value. In some embodiments, data analyzer may select between a configurable minimum and maximum number of columns. For example, data analyzer may select between 4 and 8 columns that satisfy $u > x*(1-x)$, where $x=0.9$. This captures the columns that have more than 10% of values that are non-distinct but prefers columns that have an equal balance of distinct and non-distinct values. Of the remaining eligible columns up to 8 are picked to be level 1.

Next, data analyzer 300 can determine which columns to assign LSH values. In some embodiments, data analyzer can apply LSH to a column if it has more than a configurable number of tokens on average in the column. For array-type columns, array elements may be considered as tokens or each array element may be split by whitespace and the result set may be considered tokens. LSH can be used for finding approximately duplicate documents. For example, using LSH, for each document d, a minhash algorithm can be applied to yield m minhashes. The minhashes can be grouped into b bands where each band comprises $$w = \frac{m}{b}$$

minhashes. Each of these bands constitutes a blocking key. LSH has the useful property that by selecting appropriate positive integer values of b and w, bounds may be placed on the probability of a pair of records sharing a blocking key given their Jaccard Similarity. Data analyzer can determine values of b and w based on a slider value, s, picked by the customer. Low values of s<0.1 receive an LSH configuration of 1 band, b, with 10 min-hashes per band, whereas higher values of s>0.8 use LSH with 5 bands with 6 min-hashes per band.

Data analyzer may also determine the max block size based on the input dataset record count r and the value picked by the customer, s, as:

maxBlockSize=(0.75+(0.5*s))*norm(r*0.0001)

where norm constrains the input record count factor to be in [200,500]. The resulting blocking parameters 120 can then be stored at numeral 6. Based on the identified blocking parameters, blocking configuration manager 118 can identify candidate pairs of records from ingested data 116 and provide the we have to use these unsupervised approaches to generate candidates to be labeled. At numeral 7, the candidate pairs can be passed to the customer through an interface, such as an application programming interface (API), graphical user interface (GUI), etc., and the user may identify, for each pair of records, whether the records match. In some embodiments, the customer may also provide a new slider value s. Based on the matching results, the data analyzer may further adjust the blocking parameters.

Once the blocking parameters have been determined, at numeral 8 they may be provided to dynamic blocking manager 122 to perform dynamic blocking of the ingested data. Dynamic blocking manager 122 can perform blocking to identify possibly matching pairs of records in order to avoid doing $O(n^2)$ comparisons over all pairs of records. The blocking manager can take R records as input and emit a set of (possibly overlapping) "blocks" of records, B. Each block, $b_i \in B$, is a set of records, and dynamic blocking manager can compare all $(|b_i|/2)$ pairs of records within $b_i$.

Figure 4:
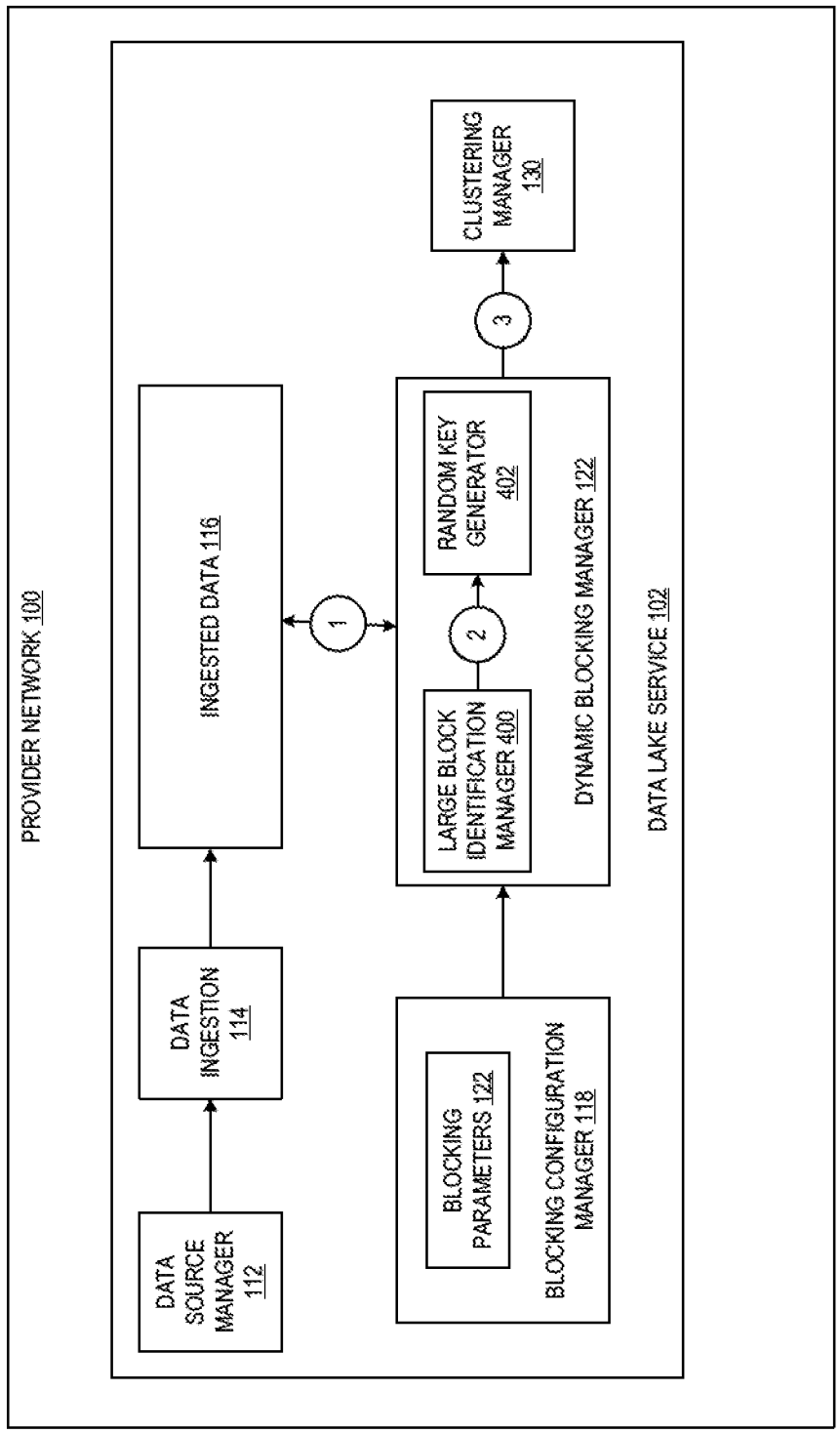
FIG. 4 is a diagram illustrating an environment for identifying and eliminating large highly overlapped blocks according to some embodiments.

FIG. 4 is a diagram illustrating an environment for identifying and eliminating large highly overlapped blocks according to some embodiments. In the dynamic blocking techniques described above, the fewest number of blocking keys are identified such that no block is larger than a threshold. Because pairwise comparisons are being performed of the records within each block, as described above with respect to FIG. 1, by keeping the blocks at or under a maximum size, the number of operations to be performed are bounded. For example, if the maximum block size parameter is set to 100, then there will not be more than 100 choose 2 pairwise comparisons to be performed. However, if a block of exact duplicate records is identified that is greater than the maximum block size parameter then the block will always be greater than the maximum block size and it will be dropped after a number of iterations of dynamic blocking. This results in a clearly matching set of records not being identified because there are too many identical records.

To address this case, dynamic blocking manager 122 can include a large block identification manager 400. At numeral 1, dynamic blocking manager 122 can obtain records from ingested data 116. Blocks may be identified as discussed above with respect to FIGS. 1-3, based on blocking parameters 122. Large block identification manager 400 can determine that a block has survived a configurable number of iterations of dynamic blocking. In some embodiments, the large block identification manager 400 can identify a large block that has more blocking keys than a configurable threshold after a number of iterations of dynamic blocking.

At numeral 2, for every record in a large block, c blocking keys can be randomly drawn by random key generator 402 from a pool of d blocking keys associated with the record, where d>c. By randomly assigning each record c blocking keys which each cover c/d of the large blocks, the resulting smaller blocks (corresponding to those records randomly assigned the subset of keys) can be used to reconstruct the original large block during the clustering phase, as shown at numeral 3. As discussed above, the clustering manager can perform a pairwise comparison of the records in each resulting block and construct a graph in which vertices correspond to each record in a block and the weighted edges are the pairwise similarity score. The smaller blocks of records are identified as being matches during the clustering phase, enabling the matching records to be identified even though collectively they were too large to be processed as a single block.

In some embodiments, if the number of identical records are larger than the maximum block size*d/c then the new blocks generated with the randomly assigned blocking keys may still be larger than the maximum block size. However, these new blocks can be iteratively processed by the dynamic blocking manager until smaller blocks have been generated, as described above. Because the randomly assigned sets of blocking keys are highly orthogonal (e.g., with an average overlap of c/d), the intersections of these blocking keys will decrease within a few iterations, bringing the resulting blocks below the threshold (e.g., maximum) block size.

Figure 5:
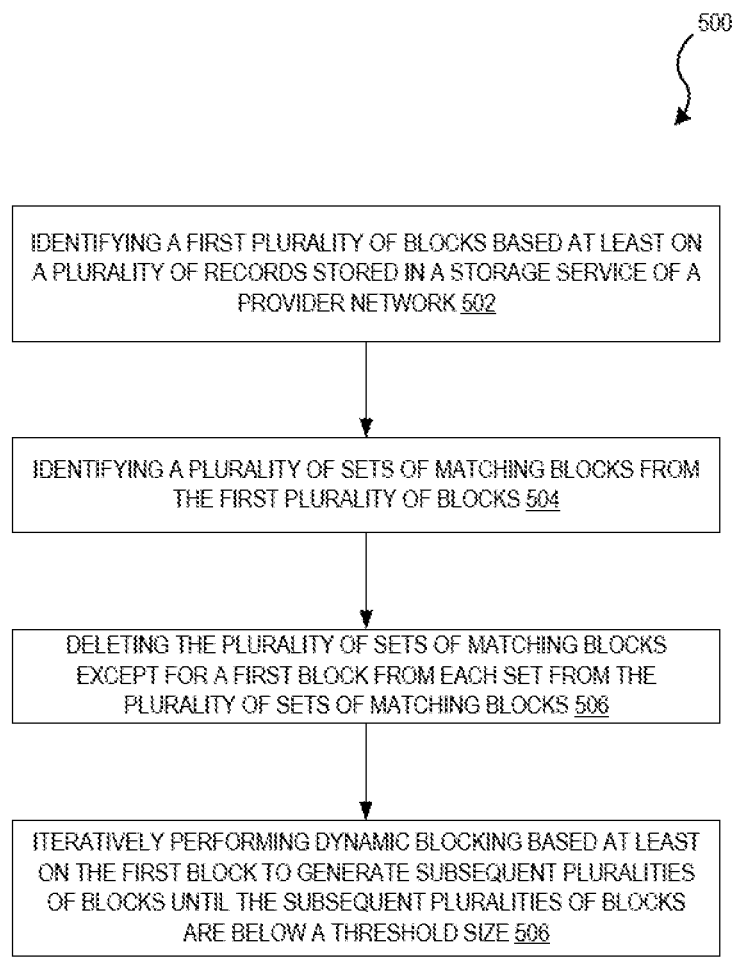
FIG. 5 is a flow diagram illustrating operations of a method for scaling record linkage via elimination of highly overlapped blocks according to some embodiments.

FIG. 5 is a flow diagram illustrating operations of a method for scaling record linkage via elimination of highly overlapped blocks according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by data lake service 102 of the other figures.

The operations 500 include, at block 502, identifying a first plurality of blocks based at least on a plurality of records stored in a storage service of a provider network. In some embodiments, dynamic blocking is intersection dynamic blocking as discussed above.

The operations 500 further include, at block 504, identifying a plurality of sets of matching blocks from the first plurality of blocks. In some embodiments, identifying a plurality of matching blocks from the plurality of blocks further comprises determining a similarity metric associated with each pair of blocks from the plurality of blocks, wherein the plurality of matching blocks includes at least two blocks having a similarity metric greater than a threshold value. In some embodiments, the threshold value decreases with each iteration of dynamic blocking. In some embodiments, the similarity metric is a Jaccard similarity index.

The operations 500 further include, at block 506, deleting the plurality of sets of matching blocks except for a first block from each set from the plurality of sets of matching blocks. The operations 500 further include, at block 508, iteratively performing dynamic blocking based at least on the first block to generate subsequent pluralities of blocks until the subsequent pluralities of blocks are below a threshold size.

In some embodiments, the operations may further include identifying the first block from the plurality of matching blocks based at least on a number of records associated with the first block, wherein the number of records associated with the first block is greater than a number of records associated with any of the other blocks from the plurality of matching blocks.

In some embodiments, the operations may further include detecting an end condition, and outputting a third plurality of blocks generated during a last dynamic blocking. In some embodiments, the operations may further include performing pairwise matching on the plurality of records represented by the third plurality of blocks, and generating a weighted graph of records, wherein each vertex of the graph represents a record from the plurality of records and each edge is weighted based at least on the pairwise matching of the plurality of records. In some embodiments, the operations may further include identifying a plurality of matching records using a clustering algorithm applied to the weighted graph of records. In some embodiments, the end condition includes at least one of a minimum threshold value has been reached or each block from the third plurality of blocks is associated with a number of records that is less than or equal to a maximum block size parameter. In some embodiments, the maximum block size parameter is based at least on a total number of records in the plurality of records and a value received from a client device.

In some embodiments, the operations may further include identifying at least one block associated with more than a threshold number of blocking keys after a particular number of iterations of dynamic blocking, for each record in the at least one block, randomly selecting a subset of blocking keys from the blocking keys associated with the at least one block and assigning the subset of blocking keys to the record, identifying a second plurality of blocks based at least on the records in the at least one block that have been assigned a random subset of blocking keys, and iteratively performing dynamic blocking on the second plurality of blocks.

The operations 500 may include obtaining records from a plurality of data sources based at least on credentials received from a client device, normalizing the records, storing the records in a data lake service in a provider network, determining one or more blocking parameters based at least on the records, identifying a first plurality of blocks based at least on the records stored in the data lake service using the one or more blocking parameters, each block representing a subset of records sharing at least one blocking key, identifying a plurality of matching blocks from the first plurality of blocks, deleting the plurality of matching blocks except for a first block from the plurality of matching blocks, iteratively performing further intersection dynamic blocking based at least on the first block to generate a subsequent plurality of blocks until an end condition is detected, performing pairwise matching on a plurality of records represented by the subsequent plurality of blocks, generating a weighted graph of records, wherein each vertex of the graph represents a record from the plurality of records and each edge is weighted based at least on the pairwise matching of the plurality of records, and identifying a plurality of matching records using a transitive closure clustering algorithm applied to the weighted graph of records.

In the above examples, when a set of similar blocks is identified, one block from the set may be retained as being representative of the other similar blocks in the set while the remaining blocks of the set may be deduplicated. Rather than deleting these similar blocks, in some embodiments the similar blocks may be demoted. When a block is demoted, it may be used to intersect with other blocks outside of the set of similar blocks, but not with other blocks in the set. For example, if ten similar blocks are identified, one block may be selected as a non-demoted block, and the other nine blocks may be demoted. The demoted blocks may be used to intersect with other blocks outside of the set of similar blocks, which allows them to be used to further refine those blocks, without leading to the rapid increase in the number of blocking keys that can be caused by comparing highly similar blocks, as discussed above.

Figure 6:
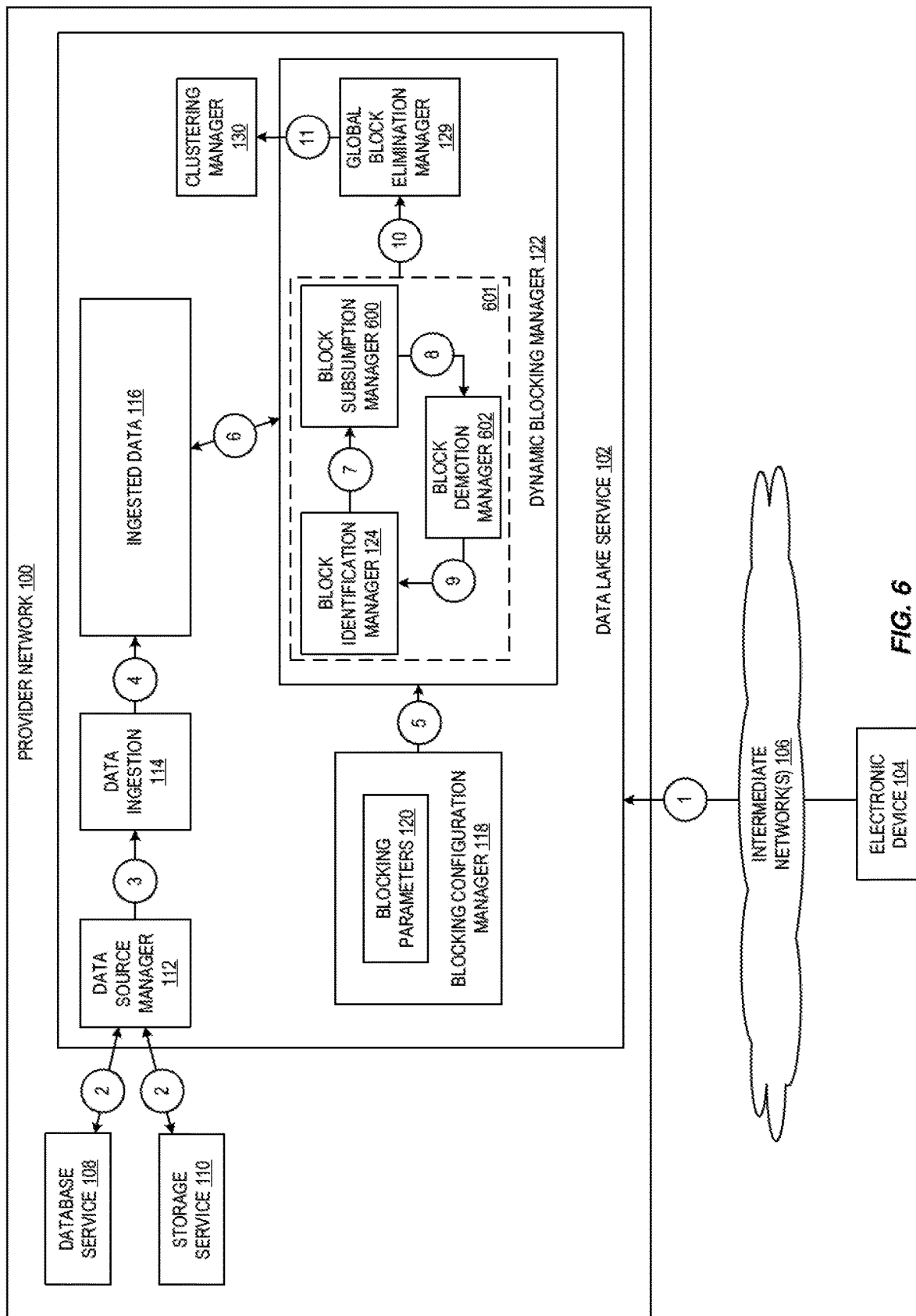
FIG. 6 is a diagram illustrating an environment for scalable elimination of approximately subsumed blocks according to some embodiments.

FIG. 6 is a diagram illustrating an environment for scalable elimination of approximately subsumed blocks according to some embodiments. Ingestion of the customer's data may proceed at numerals 1-4, as described above with respect to FIG. 1. Blocking parameters 120 can be provided by the customer, an administrator, or other entity, or they may be configured automatically, as discussed above. At numeral 6, dynamic blocking manager 122 can obtain sets of records. As discussed, blocking may include performing a pairwise comparison of records. However, unlike the above-described techniques, where if a block is identified as a subset, or approximate subset, of another block, it can be discarded, in the embodiment of FIG. 6, such blocks may be demoted.

Numerals 7-9 illustrate the intersection dynamic blocking iterative loop 601 in which blocks that are identified as a subset or approximate subset of another block are demoted. At numeral 7, block subsumption manager 600 can analyze the blocks generated by block identification manager 124 to identify approximately subsumed blocks. In some embodiments, the block subsumption manager can receive a set of sets S. Each set in the set of sets may be a block. S can be partitioned into two subsets $S_r$ and $S_d$. The blocks added to $S_d$ can be safely discarded because they have a high level of subsumption by sets in $S_r$. Subsumption of a set, u, by another set, t, can be defined based on the fraction of elements of u that are included in t, and the cardinality of t relative to u (e.g., the number of elements in t relative to the number of elements in u).

For example, pairwise subsumptions can be detected by comparing the number of co-occurrences of each pair of sets t and u with the size of t and u. The block subsumption manager 600 can identify block identifiers associated with each record. It may then emit all pairs of block IDs for each record and count the frequency of each pair. Thus, a frequency of each pair of sets can be determined and from that frequency it can determine whether a block is subsumed by another block. Alternatively, block subsumption manager 600 can identify similar blocks by implementing the Jaccard similarity techniques described above.

If the block subsumption manager is identifying exact subsumptions (e.g., maximal sets), then every block which is not subsumed by any other block is deemed to be maximal and can be set to level 0, while all subsumed blocks are set to level 1. However, if the block subsumption manager is configured to identify approximate subsumption, then not all subsumed blocks can be demoted. At numeral 8, the blocks can be passed to block demotion manager 602 which can construct a directed graph of blocks based on their subsumption relationships identified by block subsumption manager 600. For example, where block A approximately subsumes block B, and block B approximately subsumes block C. Block B can be demoted because it is subsumed by block A. However, because in this example each subsumption is approximate and not exact, block C may not be subsumed by block A. As such, block C is retained as a level 0 block. Block demotion manager can demote blocks in alternating levels of the directed graph. At numeral 9, the level 0 and level 1 blocks can be passed back to block identification manager 124 and the process may continue to iterate until an end condition is met (e.g., until a set number of iterations have been performed, all blocks are equal to or less than a max block size, etc.).

In some embodiments, a block may automatically be demoted if it is above a first size threshold (e.g., number of records). In some embodiments, if the block is larger than a second size threshold it may be discarded. For example, such blocks are too large to be used as a blocking key and may represent very common values such as null values, "N/A," etc. In some embodiments, the first size threshold may be reduced with each iteration of the intersection dynamic blocking loop 601 shown at numerals 7-9. This forces the blocks to either shrink or be discarded. and if the block isn't shrinking fast enough then threshold A is a fallback. In some embodiments, the thresholds may be relative to the total number of records. For example, a second threshold value may be defined as 0.5, where if a key appears in more than half the values of a column then the block representing that key is discarded.

As discussed above, at numeral 10, the output of the intersection dynamic blocking loop 601 (e.g., acceptable sized blocks) can optionally be provided to global block elimination manager 129. Global block elimination manager can identify any of the output blocks that are completely subsumed by other blocks. In some embodiments, global block elimination manager can implement the techniques described above with respect to block subsumption manager 600 to identify exactly subsumed blocks. Any exactly subsumed blocks that are identified from the output of all of the iterations of intersection dynamic blocking can then be deleted before passing the remaining blocks to clustering manager 130 at numeral 11. Clustering manager 130 can process the blocks similarly to the implementation described above with respect to FIG. 1.

In some embodiments, the embodiment shown in FIG. 6 may be combined with the embodiment shown in FIG. 1, where instead of retaining one block and discarding those determined to be similar, the similar blocks can be demoted.

Once an end condition has been reached then the resulting blocks can be passed to clustering manager 130 at numeral 10. In some embodiments, if any resulting blocks still exceed the maximum block size, then these blocks may be discarded prior to sending the resulting blocks to the clustering manager. Clustering manager 130 can implement a matching algorithm, such as a pairwise matching algorithm and a clustering algorithm, such as transitive closure clustering, to identify matching records based on the resulting blocks. In some embodiments, the matching algorithm can be used to determine a probability that each pair of records of each resulting block provided by dynamic blocking manager 122 is a match. Based on the probabilities, a sparse weighted graph can be constructed in which the vertices correspond to input records and the weighted edges are the pairwise similarity score. The clustering algorithm can partition this graph into non-overlapping clusters of records such that each partition corresponds to a real-world entity.

Figure 7:
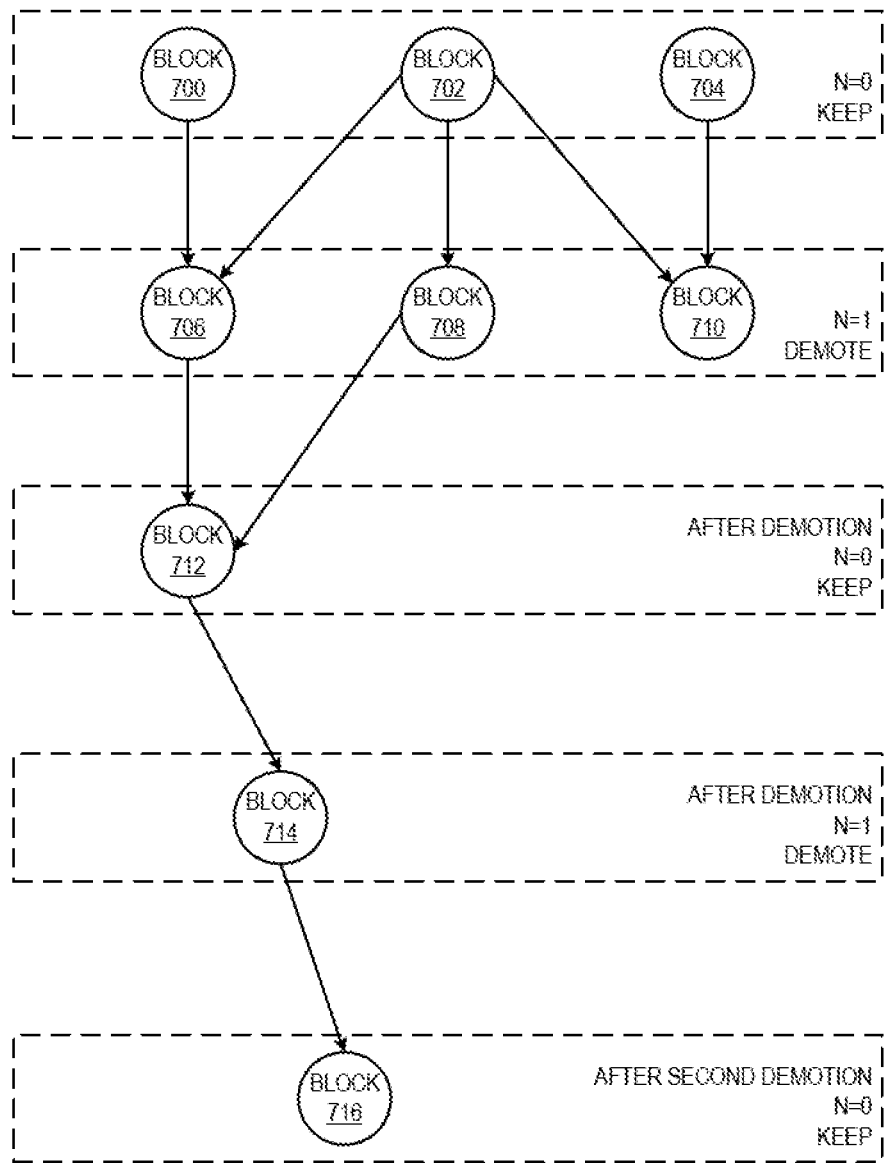
FIG. 7 is a diagram illustrating an example of block demotion using a directed graph according to some embodiments.

FIG. 7 is a diagram illustrating an example of block demotion using a directed graph according to some embodiments. A directed graph of blocks is shown in FIG. 7, where each block that has no vertices pointing into it (e.g., blocks 700-704) are not subsumed by any other blocks, and each block with vertex pointing into is subsumed by that vertex (and therefore is subsumed by the block that vertex represents). For example, block 710 is subsumed by blocks 702 and 704, block 706 is subsumed by blocks 700 and 702, and block 708 is subsumed by block 702. As described above, the directed graph may represent approximate subsumption.

For example, if approximate subsumption is defined as 0.95, then block 700 may at least 95% subsume block 706 and block 706 may at least 95% subsume block 712. As a result, it is unknown whether block 700 at least 95% subsumes block 712 (e.g., it may be as high as 100% or as low as 90%).

The first level of the graph, N=0, where none of blocks have vertices pointing into them therefore needs to be retained as level 0. The second level, N=1, includes blocks that are subsumed by the blocks of N=0, therefore these blocks may all be demoted to level 1. After demoting the N=1 level, the top two levels of the graph can be removed, resulting in the third level being N=0, with no vertices pointing into the nodes of it (e.g., because blocks 700-710 have been remoted). Block 712 therefore needs to be retained. Block 714, now at N=1, can be demoted because it is subsumed by block 712. This process can be repeated, alternating retaining and demoting the blocks of each level of the graph until all blocks have been retained or demoted.

Figure 8:
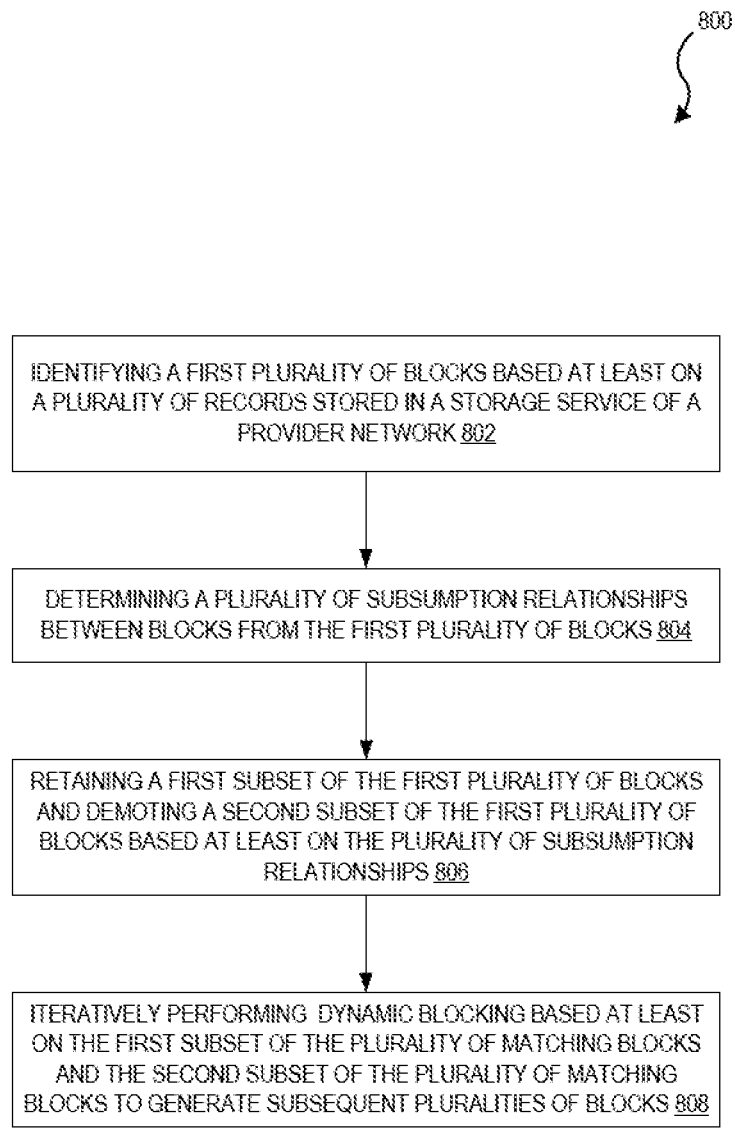
FIG. 8 is a flow diagram illustrating operations of a method for scalable elimination of approximately subsumed blocks according to some embodiments.

FIG. 8 is a flow diagram illustrating operations of a method for scalable elimination of approximately subsumed blocks according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by the data lake service 102 of the other figures.

The operations 800 include, at block 802, identifying a first plurality of blocks based at least on a plurality of records stored in a storage service of a provider network. In some embodiments, the dynamic blocking include intersection dynamic blocking.

The operations 800 further include, at block 804, determining a plurality of subsumption relationships between blocks from the first plurality of blocks. In some embodiments, the plurality of subsumption relationships include pairs of blocks in the first plurality of blocks where a first block is partially subsumed by a second block. In some embodiments, the plurality of subsumption relationships are determined based at least on a ratio of a number of records associated with the first block that are associated with the second block to a total number of records associated with the first block and the second block. In some embodiments, the plurality of subsumption relationships are determined based at least on a similarity metric associated with each pair of blocks from the first plurality of blocks, wherein the plurality of matching blocks includes at least two blocks having a similarity metric greater than a threshold value.

The operations 800 further include, at block 806, retaining a first subset of the first plurality of blocks and demoting a second subset of the first plurality of blocks based at least on the plurality of subsumption relationships. In some embodiments, the operations may further include generating a directed graph based at least on the subsumption relationships, wherein each vertex of the directed graph is associated with a block from the first plurality of blocks and each edge represents a subsumption relationship between two of the blocks. In some embodiments, retaining a first subset of the plurality of matching blocks and demoting a second subset of the plurality of matching blocks based at least on the plurality of subsumption relationships may further include identifying a first level of the directed graph, the first level comprising at least a portion of the first subset of the first plurality of blocks, and identifying a second level of the directed graph, the second level comprising at least a portion of the second subset of the first plurality of blocks, the portion of the second subset subsumed by the portion of the first subset.

The operations 800 further include, at block 808, iteratively performing dynamic blocking based at least on the first subset of the plurality of matching blocks and the second subset of the plurality of matching blocks to generate subsequent pluralities of blocks. In some embodiments, the operations may further include determining at least a first block is associated with a first number of records greater than a first threshold number of records, and demoting at least the first block. In some embodiments, the operations may further include determining at least a second block is associated with a second number of records greater than a second threshold number of records, and deleting at least the second block.

In some embodiments, the operations may include obtaining records from a plurality of data sources based at least on credentials received from a client device, normalizing the records, storing the records in a data lake service in a provider network, determining one or more blocking parameters based at least on the records, identifying a first plurality of blocks based at least on a plurality of records stored in the data lake service using the one or more blocking parameters, each block representing a subset of records sharing at least one blocking key, determining a plurality of subsumption relationships between blocks from the first plurality of blocks, retaining a first subset of the first plurality of blocks and demoting a second subset of the first plurality of blocks based at least on the plurality of subsumption relationships, and iteratively performing further intersection dynamic blocking based at least on the first subset of the plurality of matching blocks and the second subset of the plurality of matching blocks to generate a subsequent plurality of blocks until an end condition is detected.

Figure 9:
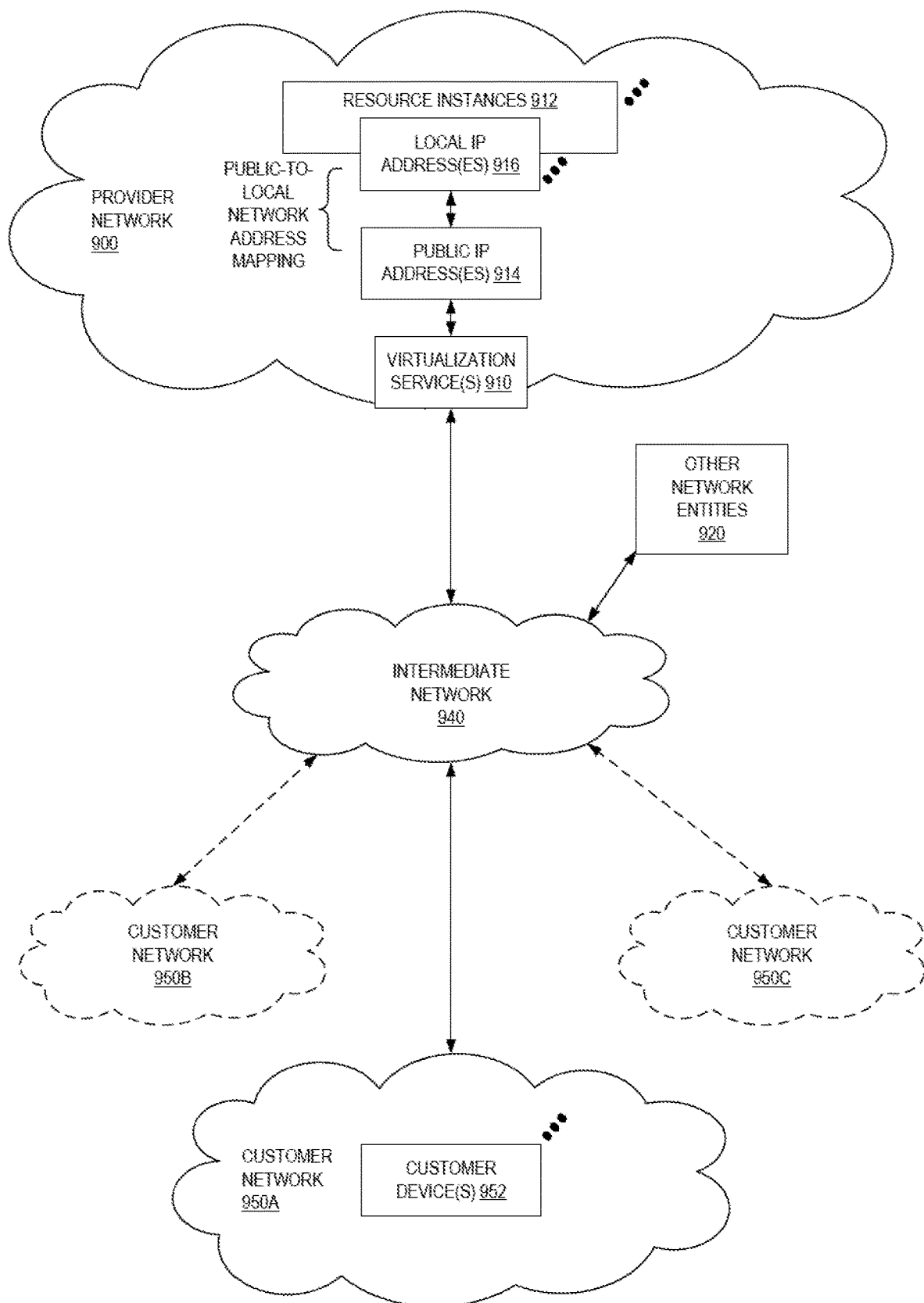
FIG. 9 illustrates an example provider network environment according to some embodiments.

In some embodiments, the second subset of the first plurality of blocks is not intersected with the first subset of the first plurality of blocks during the further intersection dynamic blocking. In some embodiments, a directed graph is generated based at least on the subsumption relationships, wherein each vertex of the directed graph is associated with a block from the plurality of blocks and each edge represents a subsumption relationship between two of the blocks FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
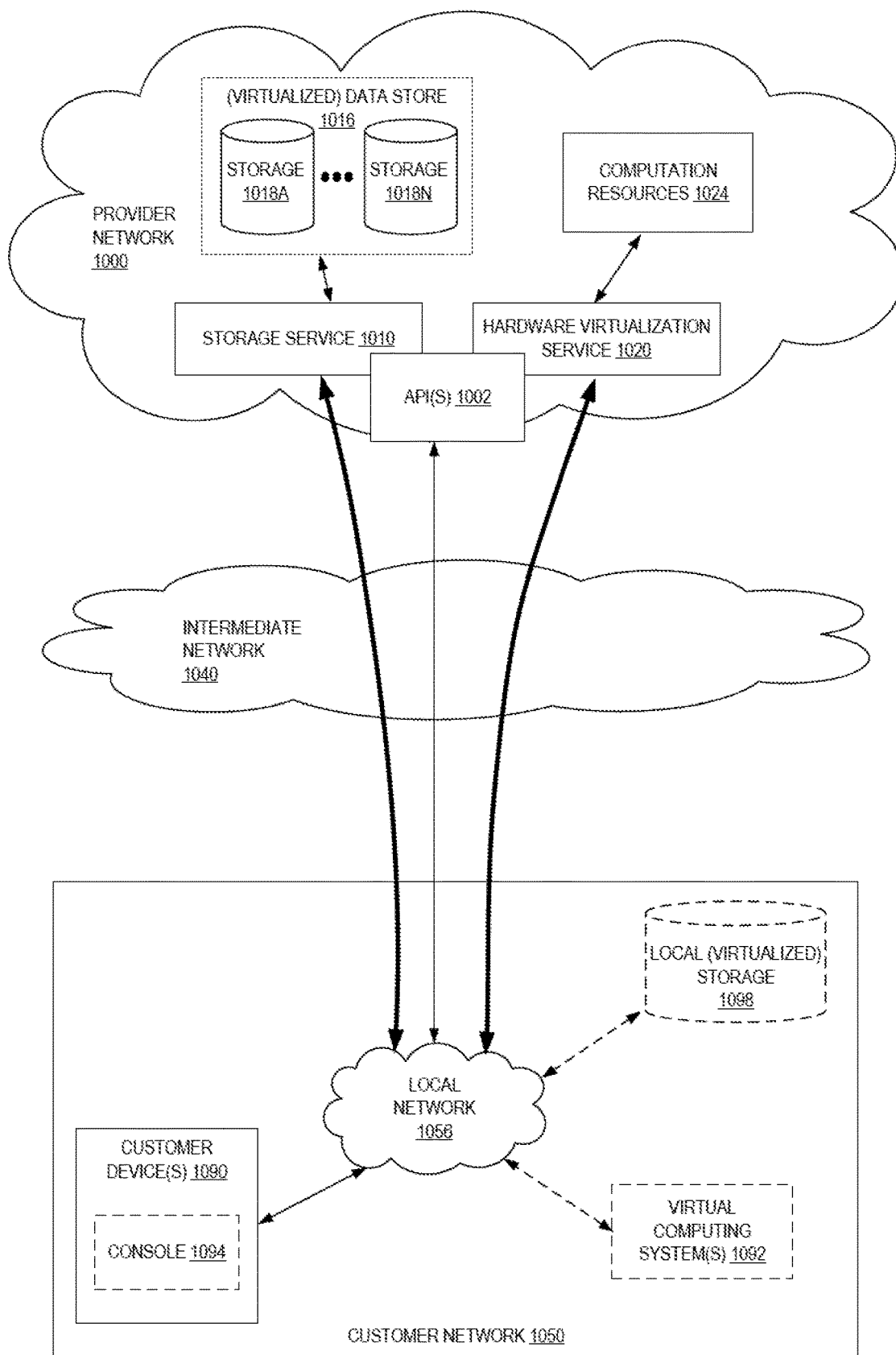
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative System

Figure 11:
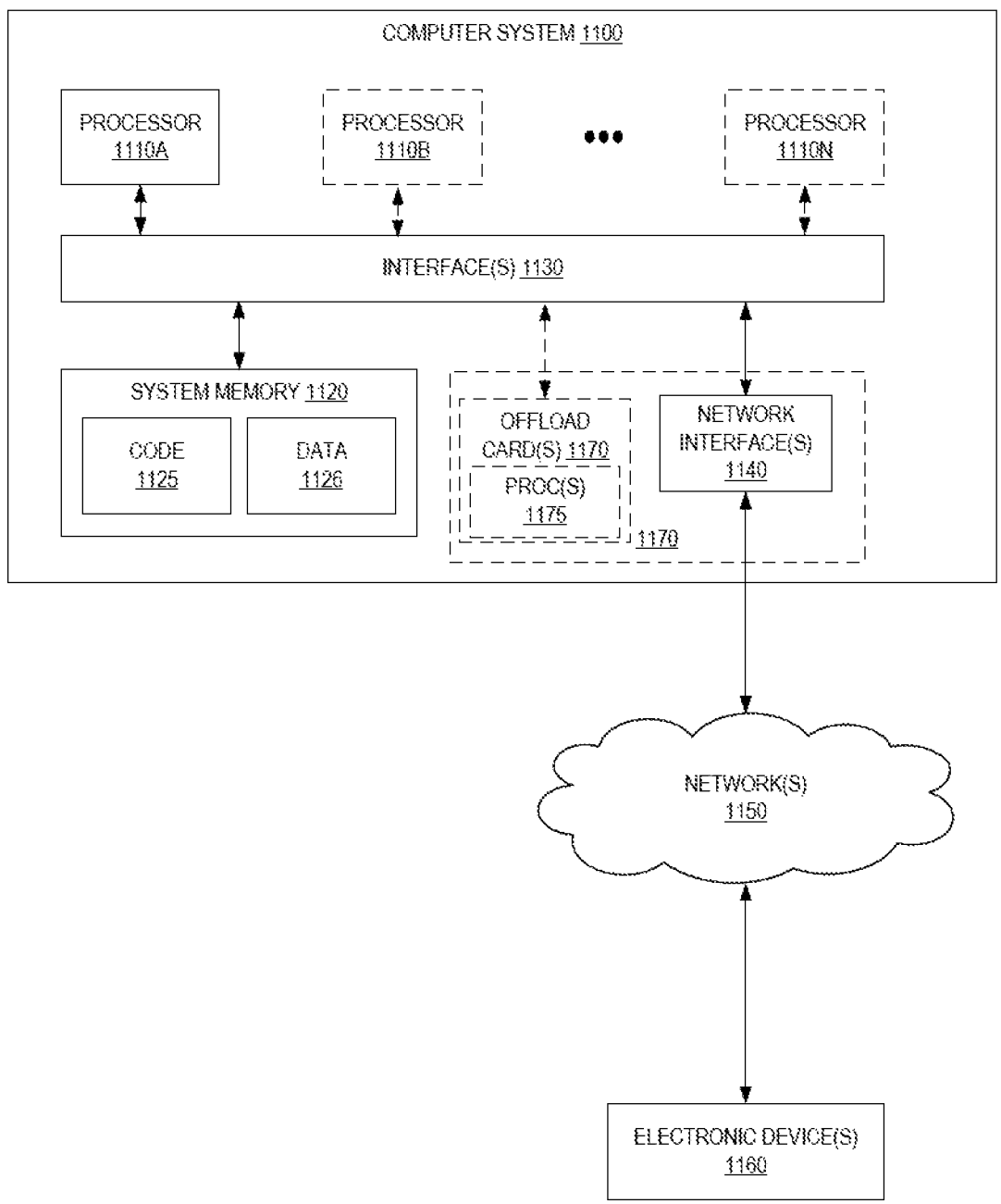
FIG. 11 is a block diagram illustrating an example computer system that may be used in some embodiments.

In some embodiments, a system that implements a portion or all of the techniques for scaling record linkage via elimination of highly overlapped blocks as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, wellknown features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining records from a plurality of data sources based at least on credentials received from a client device;
    normalizing the records;
    storing the records in a data lake service in a provider network;
    determining one or more blocking parameters based at least on the records;
    identifying a plurality of blocks based at least on a plurality of records stored in the data lake service using the one or more blocking parameters, each block representing a subset of records sharing at least one blocking key;
    determining a plurality of subsumption relationships between blocks from the first plurality of blocks;
    retaining a first subset of the first plurality of blocks and demoting a second subset of the first plurality of blocks based at least on the plurality of subsumption relationships; and
    iteratively performing further intersection dynamic blocking based at least on the first subset of the plurality of matching blocks and the second subset of the plurality of matching blocks to generate a subsequent plurality of blocks until an end condition is detected.

2. The computer-implemented method of claim 1, wherein the second subset of the first plurality of blocks is not intersected with the first subset of the first plurality of blocks during the further intersection dynamic blocking.

3. The computer-implemented method of claim 1, wherein a directed graph is generated based at least on the subsumption relationships, wherein each vertex of the directed graph is associated with a block from the plurality of blocks and each edge represents a subsumption relationship between two of the blocks.

4. A computer-implemented method comprising:
    identifying a first plurality of blocks based at least on a plurality of records stored in a storage service of a provider network;
    determining a plurality of subsumption relationships between blocks from the first plurality of blocks;
    retaining a first subset of the first plurality of blocks and demoting a second subset of the first plurality of blocks based at least on the plurality of subsumption relationships; and
    iteratively performing dynamic blocking based at least on the first subset of the plurality of matching blocks and the second subset of the plurality of matching blocks to generate a subsequent pluralities of blocks.

5. The computer-implemented method of claim 4, wherein the plurality of subsumption relationships include pairs of blocks in the first plurality of blocks where a first block is partially subsumed by a second block.

6. The computer-implemented method of claim 5, wherein the plurality of subsumption relationships are determined based at least on a ratio of a number of records associated with the first block that are associated with the second block to a total number of records associated with the first block and the second block.

7. The computer-implemented method of claim 5, wherein the plurality of subsumption relationships are determined based at least on a similarity metric associated with each pair of blocks from the first plurality of blocks, wherein the plurality of matching blocks includes at least two blocks having a similarity metric greater than a threshold value.

8. The computer-implemented method of claim 4, further comprising:
    generating a directed graph based at least on the subsumption relationships, wherein each vertex of the directed graph is associated with a block from the first plurality of blocks and each edge represents a subsumption relationship between two of the blocks.

9. The computer-implemented method of claim 8, wherein retaining a first subset of the plurality of matching blocks and demoting a second subset of the plurality of matching blocks based at least on the plurality of subsumption relationships further comprising:
    identifying a first level of the directed graph, the first level comprising at least a portion of the first subset of the first plurality of blocks; and
    identifying a second level of the directed graph, the second level comprising at least a portion of the second subset of the first plurality of blocks, the portion of the second subset subsumed by the portion of the first subset.

10. The computer-implemented method of claim 4, further comprising:
   determining at least a first block is associated with a first number of records greater than a first threshold number of records; and
   demoting at least the first block.

11. The computer-implemented method of claim 10, further comprising:
   determining at least a second block is associated with a second number of records greater than a second threshold number of records; and
   deleting at least the second block.

12. The computer-implemented method of claim 4, wherein the dynamic blocking include intersection dynamic blocking.

13. A system comprising:
   a storage service implemented by a first one or more electronic devices; and
   a data lake service implemented by a second one or more electronic devices, the data lake service including instructions that upon execution cause the data lake service to:
      identify a first plurality of blocks based at least on a plurality of records stored in a storage service of a provider network;
      determine a plurality of subsumption relationships between blocks from the first plurality of blocks;
      retain a first subset of the first plurality of blocks and demote a second subset of the first plurality of blocks based at least on the plurality of subsumption relationships; and
      iteratively perform dynamic blocking based at least on the first subset of the plurality of matching blocks and the second subset of the plurality of matching blocks to generate subsequent pluralities of blocks.

14. The system of claim 13, wherein the instructions, when executed, further cause the data lake service to:
   generate a directed graph based at least on the subsumption relationships, wherein each vertex of the directed graph is associated with a block from the first plurality of blocks and each edge represents a subsumption relationship between two of the blocks.

15. The system of claim 14, wherein the plurality of subsumption relationships include pairs of blocks in the first plurality of blocks where a first block is partially subsumed by a second block.

16. The system of claim 15, wherein the plurality of subsumption relationships are determined based at least on a ratio of a number of records associated with the first block that are associated with the second block to a total number of records associated with the first block and the second block.

17. The system of claim 15, wherein the plurality of subsumption relationships are determined based at least on a similarity metric associated with each pair of blocks from the first plurality of blocks, wherein the plurality of matching blocks includes at least two blocks having a similarity metric greater than a threshold value.

18. The system of claim 14, wherein to retain a first subset of the plurality of matching blocks and demote a second subset of the plurality of matching blocks based at least on the plurality of subsumption relationships, the instructions, when executed, further cause the data lake service to:
   identify a first level of the directed graph, the first level comprising at least a portion of the first subset of the first plurality of blocks; and
   identify a second level of the directed graph, the second level comprising at least a portion of the second subset of the first plurality of blocks, the portion of the second subset subsumed by the portion of the first subset.

19. The system of claim 14, wherein the instructions, when executed, further cause the data lake service to:
   determine at least a first block is associated with a first number of records greater than a first threshold number of records; and
   demote at least the first block.

20. The system of claim 19, wherein the instructions, when executed, further cause the data lake service to:
   determine at least a second block is associated with a second number of records greater than a second threshold number of records; and
   delete at least the second block.

* * * * *